Patented Feb. 21, 1933

1,898,512

UNITED STATES PATENT OFFICE

BRUNO WENDT, OF DESSAU IN ANHALT, GERMANY, ASSIGNOR, BY MESNE ASSIGNMENTS, TO AGFA ANSCO CORPORATION, OF BINGHAMTON, NEW YORK, A CORPORATION OF NEW YORK

PROCESS OF MANUFACTURING PHOTOGRAPHIC SILVER SALT EMULSIONS AND LIGHT-SENSITIVE MATERIAL

No Drawing. Application filed January 5, 1928, Serial No. 244,782, and in Germany January 7, 1927.

The present invention relates to the manufacture of colloids for photographic silver salt emulsions and to the manufacture of photographic materials containing such emulsions, and more particularly it relates to a treatment of the colloid employed in manufacturing the emulsion to enhance its ripening qualities.

I have found that photographic silver salt emulsions of excellent ripening properties are made by subjecting previously a part or the whole of the colloid which serves as a carrier for the silver salt to a treatment with a sulfurizing agent to increase its content of active sulfur. For this treatment proteins or raw materials containing proteins, e. g. hide cuttings, glue solution or other parent materials for the manufacture of gelatin, finished gelatin or its degradation products are treated with small quantities of colloidal sulfur, a sulfide, particularly an alkali metal sulfide, or an alkaline earth metal sulfide, carbon disulfide or some other sulfurizing agent. The small traces of iron or other metallic impurities contained in most gelatins are not destructive in this process; they appear indeed to have an accelerating action.

*Example 1.*—500,000 parts of a gelatin solution are digested with 1 part of sodium sulfide during 2 hours and then dried. 300 grams of this gelatin are dissolved in 1 liter of water and mixed with a solution of 720 grams of potassium bromide and 40 grams of potassium iodide in 4 liters of water. Into this mixture a solution of 1 kg. of silver nitrate in 10 liters of water is poured at a temperature of 60–70° C. After having added 2,3 kg. of the same gelatine dissolved in 9 liters of water the whole is digested for 1½ hours at the same temperature. The emulsion is then coagulated, cut and thoroughly washed with water.

The use of an excess of sodium sulfide in the treatment of the gelatin has the effect that the gelatin yields silver salt emulsions which are worthless because they tend to form a fog. By a cautious oxidation, e. g. with perchloric acid, the tendency of the gelatin to fog can be removed.

*Example 2.*—2,6 grams of gelatin are boiled with 0,2 gram of colloidal sulfur or heated in an autoclave with 10 grams of carbon disulfide in slightly acid solution during 1 hour; the uncombined carbon disulfide is removed by distillation. 0,3 gram of the treated gelatin is added to a solution of 300 grams of non-treated gelatin in 1 liter of water. This solution is mixed with a solution of 720 grams of potassium bromide and 40 grams of potassium iodide in 4 liters of water and a solution of 1 kg. of silver nitrate in 10 liters of water is poured into this mixture at a temperature of 60–70° C. After addition of a further solution of 2,3 kgs. non-treated gelatin and 2,3 grams of treated gelatin in 9 liters of water the emulsion is digested during 1½ hours at the same temperature, cooled, coagulated, cut and washed in usual manner.

The colloidal sulfur is reduced by boiling with the proteins to a state in which it reacts with silver salts. A desensitizing influence is never to be observed afterwards in the emulsion.

When a protein material is treated with sulfurizing agents according to my new process, the protein molecules combine with sulfur atoms. The theory of this reaction has not been quite elucidated; it must be assumed, however, that the sulfur atoms are linked to free valencies of the protein molecules, since, during the ripening process of silver halide emulsions prepared with the sulfurized proteins, sulfur is only slowly and gradually split off to combine with silver and form silver sulfide. It is well known to those skilled in the art that just the slow and gradual splitting off of sulfur is the characteristic of an emulsion with good photographic ripening qualities. Now, the present invention shows how any given gelatin and especially those materials, which due to lack of active sulfur have only little or no photographic value, can be treated to obtain a colloid of good photographic ripening qualities by increasing the quantity of sensitizing compounds in the gelatin itself.

The term "sulfurizing agent" whenever it occurs in the specification and in the following claims includes all agents which, when brought into reaction with protein compounds, increase the content of photographically active sulfur of the latter. Thus the group of sulfurizing agents suitable for the present process comprises sulfur in molecular state as well as combined in organic and inorganic sulfides.

I claim:

1. In the process of manufacturing photographic silver salt emulsions the step which comprises treating the protein serving as a carrier for the silver salt before incorporation of the latter with an agent sulfurizing the protein molecules.

2. In the process of manufacturing photographic silver salt emulsions the step which comprises treating the protein serving as a carrier for the silver salt with carbon bisulfide.

3. In the process of manufacturing photographic silver salt emulsions the step which comprises treating the gelatine serving as a carrier for the silver salt before incorporation of the latter with an agent sulfurizing the gelatin molecules.

4. In the process of manufacturing photographic silver salt emulsions the step which comprises treating the gelatine serving as a carrier for silver salt with carbon bisulfide.

In testimony whereof, I affix my signature.

BRUNO WENDT.